US012783025B2

(12) United States Patent
Chan

(10) Patent No.: US 12,783,025 B2
(45) Date of Patent: Nov. 3, 2026

(54) FAN SPEED CONTROL METHOD AND DEVICE

(71) Applicant: Getac Technology Corporation, New Taipei (TW)

(72) Inventor: Hao-Wei Chan, Taipei (TW)

(73) Assignee: Getac Technology Corporation, New Taipei (TW)

( * ) Notice: Subject to any disclaimer, the term of this patent is extended or adjusted under 35 U.S.C. 154(b) by 520 days.

(21) Appl. No.: 18/372,756

(22) Filed: Sep. 26, 2023

(65) Prior Publication Data

US 2024/0419225 A1 Dec. 19, 2024

(30) Foreign Application Priority Data

Jun. 14, 2023 (CN) ......................... 202310699543.6

(51) Int. Cl.
*G06F 1/20* (2006.01)

(52) U.S. Cl.
CPC ...................................... *G06F 1/20* (2013.01)

(58) Field of Classification Search
CPC ......................................................... G20F 1/20
See application file for complete search history.

(56) References Cited

U.S. PATENT DOCUMENTS

2007/0231119 A1 10/2007 Shen et al.
2012/0215359 A1* 8/2012 Michael .................. G06F 1/206
700/275
2015/0268705 A1* 9/2015 Treffler ................... G06F 1/181
361/679.48
2016/0266560 A1 9/2016 Chou et al.
2021/0311535 A1 10/2021 Ma et al.
2022/0221920 A1 7/2022 Shabbir et al.

FOREIGN PATENT DOCUMENTS

| | | | |
|---|---|---|---|
| CN | 101739104 | A | 6/2010 |
| CN | 110069117 | A | 7/2019 |
| CN | 109654053 | B | 5/2020 |
| CN | 113495763 | A | 10/2021 |
| CN | 114003115 | A | 2/2022 |
| CN | 111720352 | B | 7/2022 |
| DE | 202007000507 | U1 | 3/2007 |
| TW | M352067 | U | 3/2009 |
| TW | 201541229 | A | 11/2015 |
| TW | 202026806 | A | 7/2020 |
| WO | 2017020696 | A1 | 2/2017 |

OTHER PUBLICATIONS

Fan Control of CPU, GPU, Mainboard and AIO Fans, Jul. 9, 2021, 11 pages (Year: 2021).*
Taiwan Patent Office, "Office Action", May 2, 2024, Taiwan.
Examination Report issued by the IPO(Australia) on Nov. 13, 2024.
EPO, "EP Office Action and European Search Report for EP Application No. 23206709.0", Hague, Germany, Apr. 2, 2024.

* cited by examiner

*Primary Examiner* — Robert E Fennema
*Assistant Examiner* — William Xiang Zhang
(74) *Attorney, Agent, or Firm* — Troutman Pepper Locke LLP; Tim Tingkang Xia, Esq.

(57) ABSTRACT

A fan speed control method, performed by a controller, includes: obtaining a first load parameter associated with a main board; obtaining a second load parameter associated with an expansion board; determining a greater one of the first load parameter and the second load parameter, and controlling a fan according to the greater one.

16 Claims, 10 Drawing Sheets

FAN SPEED CONTROL METHOD AND DEVICE

CROSS-REFERENCE TO RELATED APPLICATIONS

This non-provisional application claims priority under 35 U.S.C. § 119(a) on Patent Application No(s). 202310699543.6 filed in China on Jun. 14, 2023, the entire contents of which are hereby incorporated by reference.

BACKGROUND

1. Technical Field

This disclosure relates to a fan speed control method and device.

2. Related Art

For commercially available computer models, it has always been a goal of engineers to avoid overheating of the casing while maintaining the balance of system performance. For example, prior art includes acquiring current tachometers of multiple heat sources of the electronic device, determining the corresponding rotational speed of the fan according to the selected current tachometers, and setting the fan corresponding to the heat sources as the rotational speed.

SUMMARY

Accordingly, this disclosure provides a fan speed control method and device.

According to one or more embodiment of this disclosure, a fan speed control method, performed by a controller, includes: obtaining a first load parameter associated with a main board; obtaining a second load parameter associated with an expansion board; determining a greater one of the first load parameter and the second load parameter; and controlling a fan according to the greater one.

According to one or more embodiment of this disclosure, a fan speed control device includes: a main board, an expansion slot, a fan and a controller. The expansion slot is disposed on the main board and configured to electrically connect an expansion board. The fan is disposed on the expansion board. The controller is disposed on the main board, electrically connected to the expansion slot, and configured to perform: obtaining a first load parameter associated with the main board; obtaining a second load parameter associated with the expansion board; determining a greater one of the first load parameter and the second load parameter; and controlling a fan according to the greater one.

In view of the above description, the fan speed control method and device according to one or more embodiments of the present disclosure may allow the speed of the fan to not fluctuates rapidly by the operation condition of the expansion board when cooling is performed using the fan. Accordingly, the fan speed may be steadily controlled, thereby easing the noise caused by the operating fan.

BRIEF DESCRIPTION OF THE DRAWINGS

The present disclosure will become more fully understood from the detailed description given herein below and the accompanying drawings which are given by way of illustration only and thus are not limitative of the present disclosure and wherein:

FIG. 5(*b*) is a flowchart illustrating a method of obtaining a second load parameter according to an embodiment of the present disclosure;

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should be noted that the following description of the fan speed control method of one or more embodiments may be performed by a controller, and may be performed periodically or non-periodically after a fan speed control device is activated. Further, after the fan speed control device is activated, the controller may also wait for a preset period of time to perform the fan speed control method, wherein said preset period of time is, for example, 30 seconds, 40 seconds or 1 minute, the present disclosure is not limited thereto. The "speed" described in the present disclosure means the rotation speed of the fan.

Figure 1:
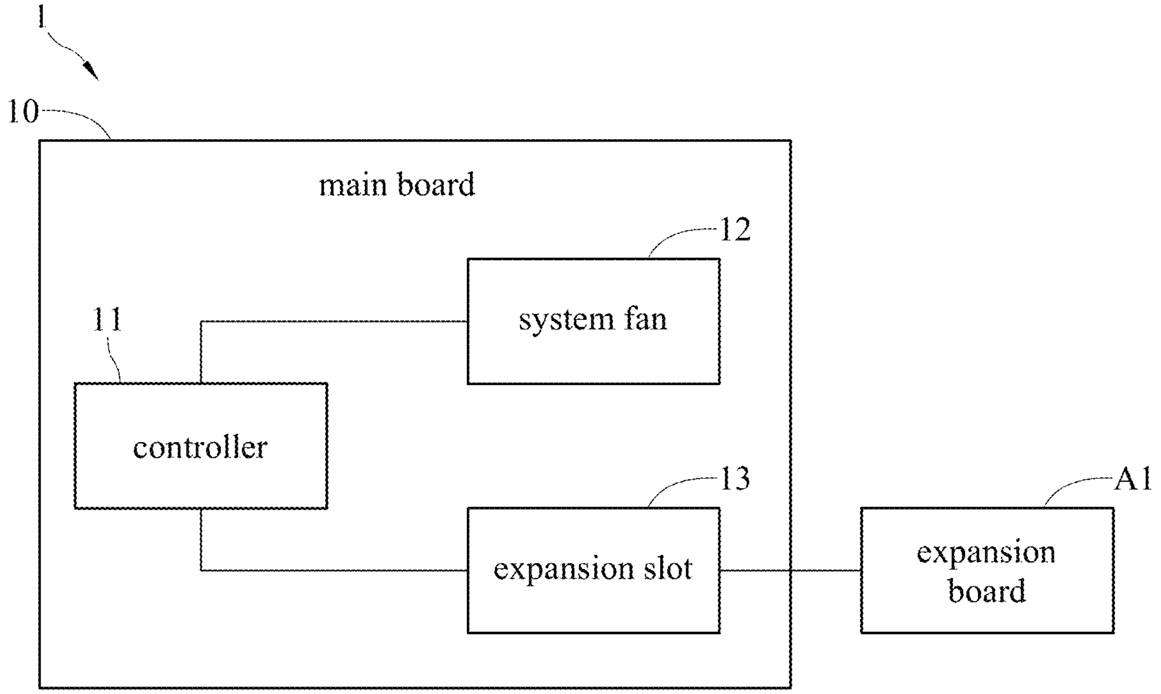
FIG. 1 is a block diagram illustrating a fan speed control device and an expansion board according to an embodiment of the present disclosure.

Please refer to FIG. 1, wherein FIG. 1 is a block diagram illustrating a fan speed control device and an expansion board according to an embodiment of the present disclosure. As shown in FIG. 1, the fan speed control device 1 includes a main board 10, a controller 11, a system fan 12 and an expansion slot 13. The fan speed control device 1 may be disposed on a computer host, that is, the fan speed control device 1 may be a part of a computer host. The controller 11, the system fan 12 and the expansion slot 13 are disposed on the main board 10. The controller 11 is electrically connected to the system fan 12 and the expansion slot 13. The main board 10 may also be referred to as a motherboard with one or more processors disposed thereon. The controller 11 may include one or more controllers, said controller is, for example, an embedded controller (EC), a microcontroller, a programmable logic controller or any other controller with signal processing function. The system fan 12 may be configured to dissipate heat from one or more elements on the main board 10, and is controlled by the controller 11. The system fan 12 is disposed on the main board 10 and corresponds to the expansion slot 13. In other words, in addition to cooling elements on the main board 10, the system fan 12 may further be used for cooling element(s) (for example, an the expansion board A1) connected to the expansion slot 13. The main board 10, the controller 11, the system fan 12 and the expansion slot 13 may be disposed on the same computer. The expansion slot 13 may include one or more of a peripheral component interconnect express (PCIE), a universal serial bus (USB) and a high definition multimedia interface (HDMI), the present disclosure is not limited thereto. The expansion slot 13 is disposed on the main board 10 and configured to electrically connect the expansion board A1, wherein another processor and another fan (for example, the expansion fan described below) may be disposed on the expansion board A1. In short, the expansion board A1 may be a board for carrying (or mounting) and connecting external processor.

Figure 2:
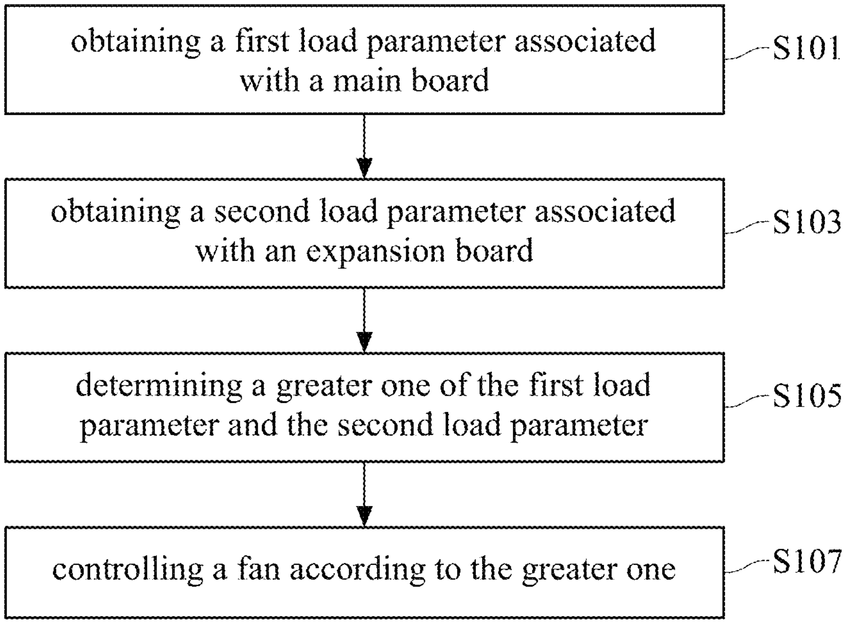
FIG. 2 is a flowchart illustrating a fan speed control method according to an embodiment of the present disclosure.

Please refer to FIG. 1 and FIG. 2, wherein FIG. 2 is a flowchart illustrating a fan speed control method according to an embodiment of the present disclosure. The fan speed control method is performed by the controller 11, and as shown in FIG. 2, includes: step S101: obtaining a first load parameter associated with a main board; step S103: obtaining a second load parameter associated with an expansion board; step S105: determining a greater one of the first load parameter and the second load parameter; and step S107: controlling a fan according to the greater one. It should be noted that step S101 may be performed before or after step S103, step S101 may also be performed with step S103 at the same time.

In step S101, the controller 11 obtains the first load parameter associated with operation condition of the main board 10. The first load parameter may be a parameter reflecting the operation condition corresponding to the main board 10, and may include a temperature of the main board 10, a temperature of a processor disposed on the main board 10, fan speed or duty cycle of the system fan 12, a processor usage of the processor disposed on the main board 10 or wattage consumption of the main board 10 etc.

In step S103, the controller 11 obtains the second load parameter associated with the operation condition of the expansion board A1. For example, the controller 11 obtains the second load parameter of the expansion board A1 through the expansion slot 13. The second load parameter may be a parameter reflecting the operation condition corresponding to the expansion slot 13, and may include a temperature of a processor disposed on the expansion board A1, fan speed or duty cycle corresponding to the temperature of the processor, fan speed or duty cycle of another fan on the expansion board A1, a processor usage of the processor or wattage consumption of the expansion board A1 etc.

In step S105, the controller 11 determines a greater one of the first load parameter and the second load parameter. The first load parameter and the second load parameter used for comparison in step S105 are the same type of parameters. For example, in step S105, if the first load parameter is the temperature of the main board 10, the second load parameter is the temperature of the processor on the expansion board A1; if the first load parameter is the processor usage of the processor disposed on the main board 10, the second load parameter is the processor usage of the processor disposed on the expansion board A1.

In step S107, the controller 11 controls the speed of the system fan 12 according to greater one of the two load parameters, or controls the speed of said another fan on the expansion board A1 according to the greater one of the two load parameters. For example, the controller 11 controls said another fan on the expansion board A1 or the system fan 12 according to the fan speed or duty cycle corresponding to the greater load parameter. In an example, assuming that the first load parameter is the temperature of the main board 10 and the second load parameter is the temperature of the processor disposed on the expansion board A1, when the second load parameter is greater than the first load parameter, the controller 11 may control said another fan on the expansion board A1 or the system fan 12 based on the fan speed corresponding to the temperature of the processor disposed on the expansion board A1. In another example, assuming that the first load parameter is the fan speed corresponding to the temperature of the main board 10 and the second load parameter is the fan speed corresponding to the temperature of the processor disposed on the expansion board A1, when the second load parameter is greater than the first load parameter, the controller 11 may control said another fan on the expansion board A1 or the system fan 12 based on the fan speed corresponding to the temperature of the processor disposed on the expansion board A1.

Further, in step S107, the controller 11 may control said another fan on the expansion board A1 or the system fan 12 according to an operating parameter-fan parameter corresponding function (referred to as "the corresponding function" hereinafter) corresponding to said greater one. For example, the first load parameter and the second load parameter may be fan speeds, the operating parameter may be temperatures. Assuming that the first load parameter is the greater one, the controller 11 may select the corresponding function corresponding to the main board 10 according to the first load parameter, read the selected corresponding function according to the temperature of the main board 10 to determine a corresponding fan parameter, and control said another fan on the expansion board A1 or the system fan 12 according to the fan parameter.

In other words, the operating parameter corresponding to the first load parameter may be the temperature of the main board 10, the processor usage of the processor disposed on the main board 10 or the wattage consumption of the main board 10. The operating parameter corresponding to the second load parameter may be the temperature of the processor disposed on the expansion board A1, the processor usage of the processor disposed on the expansion board A1 or the wattage consumption of the expansion board A1. The main board 10 and the expansion board A1 may each has a corresponding function, which records corresponding relationship between a plurality of operating parameters and a plurality of fan parameters. The corresponding function is, for example, table 1 and table 2 as shown below, and may be stored in the controller 11, wherein the numbers of pieces of data of the operating parameter in the fan parameter table 1 and table 2 are only examples.

TABLE 1

| Corresponding function of the main board | |
|---|---|
| first operating parameter | first fan parameter |
| second operating parameter | second fan parameter |

TABLE 2

| Corresponding function of the expansion board | |
|---|---|
| third operating parameter | third fan parameter |
| fourth operating parameter | fourth fan parameter |

In other words, in step S107, the controller 11 may refer to table 1 or table 2, to select the corresponding function according to the greater load parameter, determine the fan parameter according to the greater load parameter and the selected corresponding function, and control said another fan on the expansion board A1 or the system fan 12 according to the fan parameter. Take table 1 and table 2 for example, assuming that the operating parameter that the main board 10 corresponds to is the temperature of the main board 10, the operating parameter that the expansion board A1 corresponds to is the temperature of the processor disposed on the expansion board A1, and the second load parameter is greater than the first load parameter, then in step S107, the controller 11 may refer to table 2 to determine that the operating parameter (temperature) that the expansion board A1 corresponds to belongs to the third operating parameter or the fourth operating parameter. If the operating parameter (temperature) that the expansion board A1 corresponds to belongs to the third operating parameter, the controller 11 controls said another fan on the expansion board A1 or the system fan 12 according to the third fan parameter; if the operating parameter (temperature) that the expansion board A1 corresponds to belongs to the fourth operating parameter, the controller 11 controls said another fan on the expansion board A1 or the system fan 12 according to the fourth fan parameter. It should be noted that the first operating parameter to the fourth operating parameter shown in table 1 and table 2 may each be a value or a range. Take the expansion board A1 for example, the operating parameter that the expansion board A1 corresponds to belonging to the third operating parameter may mean that the operating parameter that the expansion board A1 corresponds to equals to the third operating parameter, or the operating parameter falls within the numerical range of the third operating parameter. In the embodiment where the first operating parameter to the fourth operating parameter each is a numerical range, an upper limit of the first operating parameter of the corresponding function of the main board 10 may be a lower limit of the second operating parameter, the third operating parameter of the corresponding function of the expansion board A1 may be a lower limit of the fourth operating parameter. In addition, the first operating parameter may not overlap, partially overlap or completely overlap the third operating parameter, and the second operating parameter may not overlap, partially overlap or completely overlap the fourth operating parameter.

According to one or more embodiments described above, rapid increase and decrease of the fan speed caused by the operation condition of the expansion board may be avoided when cooling is performed using the fan. Accordingly, the fan speed may be steadily controlled, thereby reducing the noise generated when controlling the fan.

Figure 3:
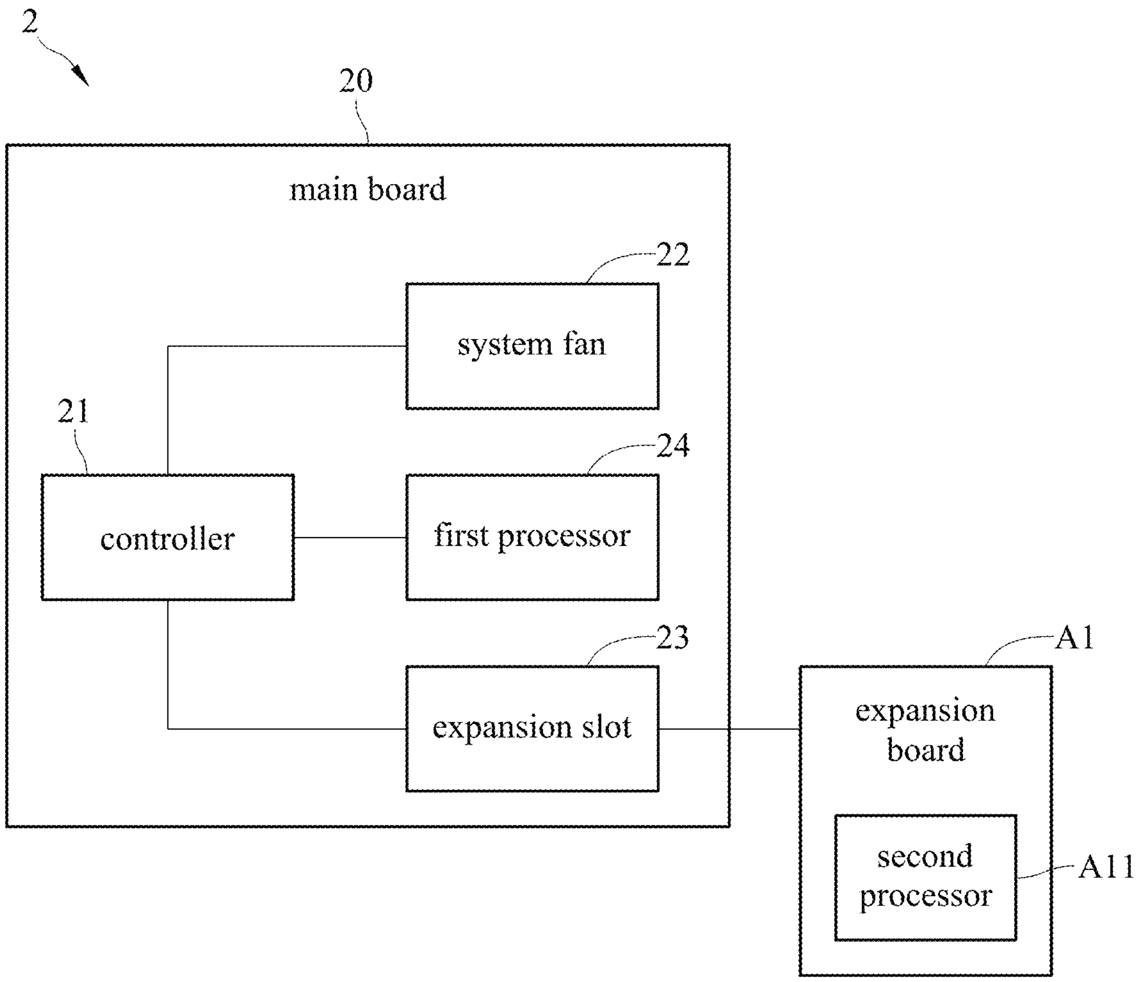
FIG. 3 is a block diagram illustrating a fan speed control device and an expansion board according to another embodiment of the present disclosure.

Please refer to FIG. 3, wherein FIG. 3 is a block diagram illustrating a fan speed control device and an expansion board according to another embodiment of the present disclosure. As shown in FIG. 3, the fan speed control device 2 according to another embodiment of the present disclosure includes a main board 20, a controller 21, a system fan 22, an expansion slot 23 and a first processor 24, wherein the expansion slot 23 is electrically connected to the expansion board A1. The fan speed control device 2 may be disposed on a computer host, that is, the fan speed control device 2 may be a part of a computer host. The implementation of the main board 20, the controller 21, the system fan 22 and the expansion slot 23 may be the same as the main board 10, the controller 11, the system fan 12 and the expansion slot 13 of FIG. 1, their details are not repeated herein. The expansion board A1 includes a second processor A11. For example, the first processor 24 may be a central processing unit (CPU), the second processor A11 may be a graphic processing unit (GPU).

Figure 4:
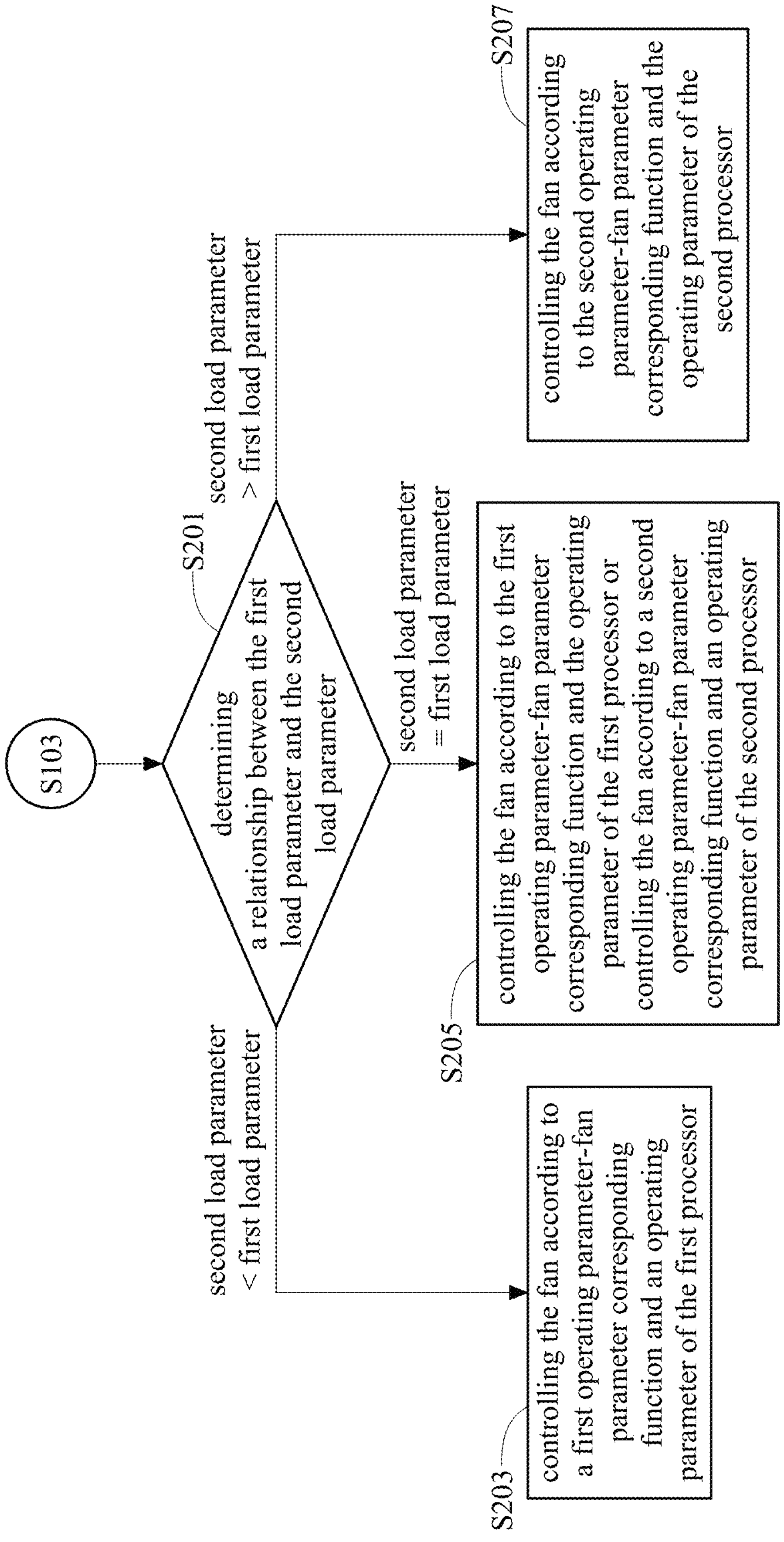
FIG. 4 is a flowchart illustrating a method of controlling a fan according to an embodiment of the present disclosure.

Please refer to FIG. 3 and FIG. 4, wherein FIG. 4 is a flowchart illustrating a method of controlling a fan according to an embodiment of the present disclosure. The fan speed control method shown in FIG. 4 is performed by the controller 21, and as shown in FIG. 4, in addition to step S101 and step S103 shown in FIG. 2, the method further includes: step S201: determining a relationship between the first load parameter and the second load parameter; if the second load parameter is lower than the first load parameter, performing step S203: controlling the fan according to a first operating parameter-fan parameter corresponding function and an operating parameter of the first processor; if the second load parameter equals to the first load parameter, performing step S205: controlling the fan according to the first operating parameter-fan parameter corresponding function and the operating parameter of the first processor or controlling the fan according to a second operating parameter-fan parameter corresponding function and an operating parameter of the second processor; and if the second load parameter is greater than the first load parameter, performing step S207: controlling the fan according to the second operating parameter-fan parameter corresponding function and the operating parameter of the second processor. Step S201 shown in FIG. 4 may be regarded as a detail flowchart of an embodiment of step S105 of FIG. 2, steps S203, S205 and S207 shown in FIG. 4 may be regarded as a detail flowchart of an embodiment of step S107 of FIG. 2.

In the embodiment of FIG. 3 and FIG. 4, the first load parameter is the load parameter of the first processor 24 disposed on the main board 20, the second load parameter is the load parameter of the second processor A11 disposed on the expansion board A1. In addition, examples of the first operating parameter-fan parameter corresponding function (referred to as "the first corresponding function" hereinafter) and the second operating parameter-fan parameter corresponding function (referred to as "the second corresponding function" hereinafter) are respectively shown in table 3 and table 4 below, and the first corresponding function and the second corresponding function may be stored in the controller 21. The first candidate operating parameter to the fourth candidate operating parameter shown in table 3 and table 4 may each be a numerical range, and an upper limit of the first candidate operating parameter of the first corresponding function may be a lower limit the second candidate operating parameter, and an upper limit of the third candidate operating parameter of the second corresponding function may be a lower limit of the fourth candidate operating parameter.

TABLE 3

| the first corresponding function | |
|---|---|
| first candidate operating parameter | first candidate fan parameter |
| second candidate operating parameter | second candidate fan parameter |

TABLE 4

| the second corresponding function | |
|---|---|
| third candidate operating parameter | third candidate fan parameter |
| fourth candidate operating parameter | fourth candidate fan parameter |

The first candidate operating parameter and the second candidate operating parameter may be the same as the operating parameter corresponding to the first load parameter as described above. In other words, each of the first candidate operating parameter and the second candidate operating parameter may be temperature of the main board 20, processor usage of the first processor 24 or wattage consumption of the main board 20. The third candidate operating parameter and the fourth candidate operating parameter may be the same as the operating parameter corresponding to the second load parameter as described above. In other words, each of the third candidate operating parameter and the fourth candidate operating parameter may be temperature of the second processor A11, processor usage of the second processor A11 or wattage consumption of the expansion board A1.

In step S201, the controller 21 determines the numerical relationship between the first load parameter and the second load parameter for the controller 21 to perform subsequent steps according to the determination result.

If the second load parameter is lower than the first load parameter, in step S203, the controller 21 looks up the first corresponding function for the candidate operating parameter that the main board 20 corresponds to according to the operating parameter of the first processor 24, and controls said another fan on the expansion board A1 or the system fan 22 according to the candidate fan parameter that the candidate operating parameter corresponds to.

If the second load parameter equals to the first load parameter, in step S205, the controller 21 looks up the first corresponding function for the candidate operating parameter that the main board 20 corresponds to according to the operating parameter of the first processor 24, and controls said another fan on the expansion board A1 or the system fan 22 according to the candidate fan parameter that the candidate operating parameter corresponds to; or, the controller 21 looks up the second corresponding function for the candidate operating parameter t according to the operating parameter of the second processor A11, and controls said another fan on the expansion board A1 or the system fan 22 according to the candidate fan parameter that the candidate operating parameter corresponds to. Further, when the second load parameter equals to the first load parameter, the controller 21 may control said another fan on the expansion board A1 or the system fan 22 according to the operating parameter of the first processor 24 and the first corresponding function, so that the speed of said another fan on the expansion board A1 or the system fan 22 may be more steady.

If the second load parameter is greater than the first load parameter, in step S207, the controller 21 looks up the second corresponding function for the candidate operating parameter corresponding to the expansion board A1 according to the operating parameter of the second processor A11, and controls said another fan on the expansion board A1 or the system fan 22 according to the candidate fan parameter that the candidate operating parameter corresponds to.

Take the first corresponding function as an example, the method of looking up the first corresponding function for the candidate operating parameter, and controlling said another fan on the expansion board A1 or the system fan 22 according to the candidate fan parameter that the candidate operating parameter corresponds to may include: the controller 21 determining which one of the candidate operating parameters in the first corresponding function equals to the operating parameter, thereby controlling said another fan on the expansion board A1 or the system fan 22 according to the candidate fan parameter that the candidate operating parameter corresponds to; or, the candidate operating parameter being a numerical range, and the controller 21 determining which one of the candidate operating parameters in the first corresponding function that the first corresponding function falls within, thereby controlling said another fan on the expansion board A1 or the system fan 22 according to the candidate fan parameter that the candidate operating parameter corresponds to. In other words, table 1 may be the same as table 3, and table 2 may be the same as table 4.

Figure 5A:
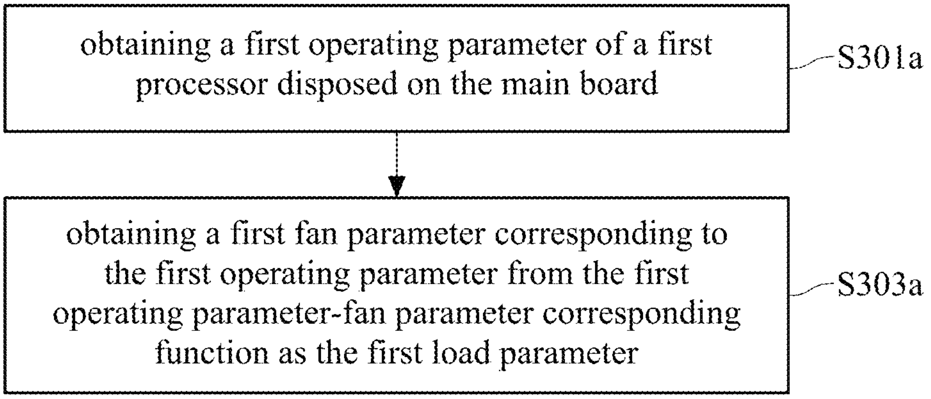
FIG. 5(*a*) is a flowchart illustrating a method of obtaining a first load parameter according to an embodiment of the present disclosure.
Figure 5B:
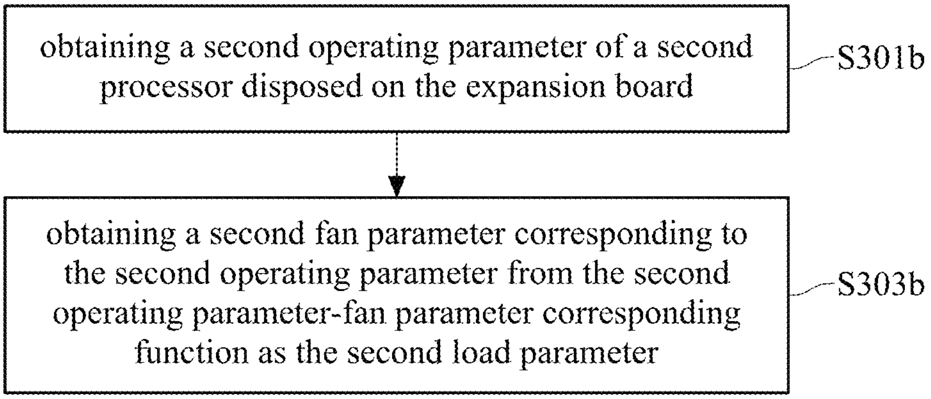

Please refer to FIG. 3 and FIG. 5(*a*), wherein FIG. 5(*a*) is a flowchart illustrating a method of obtaining a first load parameter according to an embodiment of the present disclosure. Steps shown in FIG. 5(*a*) may be regarded as a detail flowchart of an embodiment of step S101 of FIG. 2. As shown in FIG. 5(*a*), the method of obtaining the first load parameter includes: step S301*a*: obtaining a first operating parameter of a first processor disposed on the main board; and step S303*a*: obtaining a first fan parameter corresponding to the first operating parameter from the first operating parameter-fan parameter corresponding function as the first load parameter.

In step S301*a*, the controller 21 obtains the first operating parameter of the first processor 24. In step S303*a*, the controller 21 obtains the first fan parameter corresponding to the first operating parameter according to the first corresponding function as shown in table 3, and uses the obtained first fan parameter as the first load parameter.

Specifically, the controller 21 may look for the candidate operating parameter that the first operating parameter belongs to by looking up the first corresponding function (table 3), and uses the candidate fan parameter corresponding to the candidate operating parameter as the first load parameter. The method of the controller 21 looking for the first operating parameter in the first corresponding function is as described above, and is not repeated herein.

Please refer to FIG. 3 and FIG. 5(*b*), wherein FIG. 5(*b*) is a flowchart illustrating a method of obtaining a second load parameter according to an embodiment of the present disclosure. Steps shown in FIG. 5(*b*) may be regarded as a detail flowchart of an embodiment of step S103 of FIG. 2. As shown in FIG. 5(*b*), the method of obtaining the second load parameter includes: step S301*b*: obtaining a second operating parameter of a second processor disposed on the expansion board; and step S303*b*: obtaining a second fan parameter corresponding to the second operating parameter from the second operating parameter-fan parameter corresponding function as the second load parameter.

In step S301*b*, the controller 21 obtains the second operating parameter of the second processor A11. In step S303*b*, the controller 21 obtains the second fan parameter corresponding to the second operating parameter according to the second corresponding function as shown in table 4, and uses the obtained second fan parameter as the second load parameter.

Specifically, the controller 21 may look for the candidate operating parameter that the second operating parameter belongs to by looking up the second corresponding function (table 4), and uses the candidate fan parameter corresponding to the candidate operating parameter as the second load parameter. The method of the controller 21 looking for the second operating parameter in the second corresponding function is as described above, and is not repeated herein.

It should be noted that the physical unit of the first fan parameter and the physical unit of the second fan parameter are duty cycle of pulse-width modulation (PWM), or revolutions per minute (RPM) of the system fan 22. In addition, the first corresponding function describes a first corresponding policy of the first fan parameter corresponding to the first operating parameter, or a first numerical lookup table (for example, table 3) listing the first fan parameter corresponding to the first operating parameter, or a first function graph presenting the first fan parameter corresponding to the first operating parameter. The second corresponding function describes a second corresponding policy of the second fan parameter corresponding to the second operating parameter, or a second numerical lookup table (for example, table 4) listing the second fan parameter corresponding to the second operating parameter, or a second function graph presenting the second fan parameter corresponding to the second operating parameter.

Figure 6:
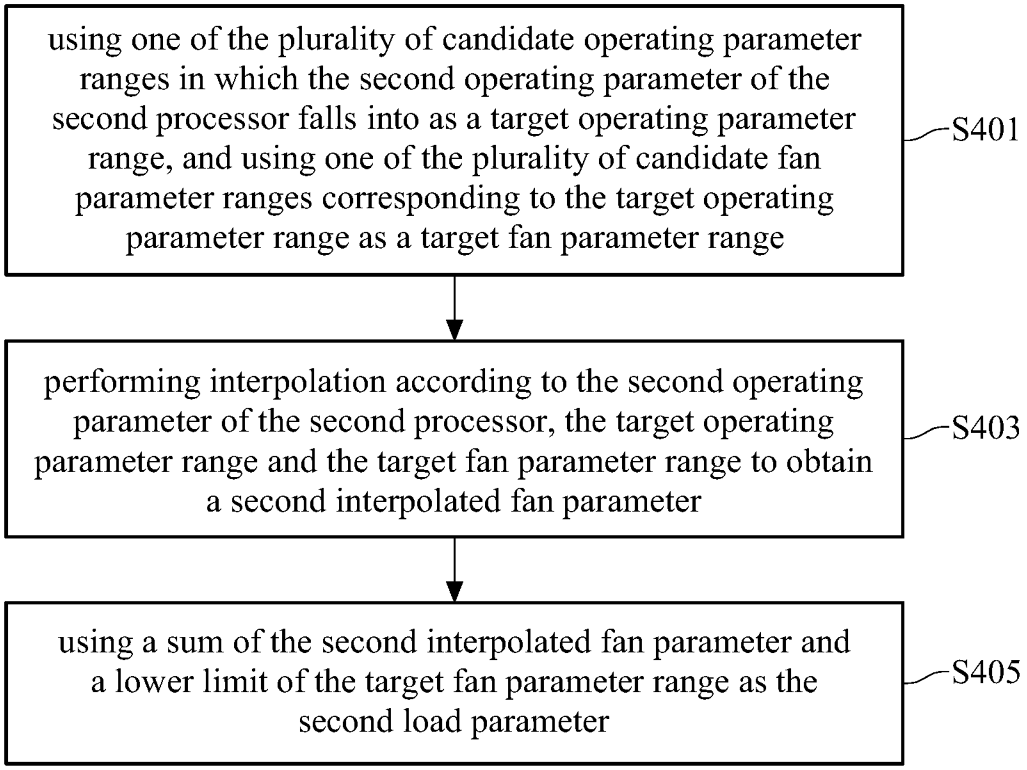
FIG. 6 is a flowchart illustrating a method of obtaining a second load parameter according to another embodiment of the present disclosure.

Please refer to FIG. 3 and FIG. 6, wherein FIG. 6 is a flowchart illustrating a method of obtaining a second load parameter according to another embodiment of the present disclosure. Steps shown in FIG. 6 may be regarded as a detail flowchart of an embodiment of step S303 *b* of FIG. 5(*b*). In the embodiment of FIG. 6, the second corresponding function includes a plurality of candidate operating parameter ranges and a plurality of candidate fan parameter ranges corresponding to the candidate operating parameter ranges, the format may be the same as table 4. For example, each of the candidate operating parameter ranges is a temperature range of the expansion board A1, and each of the candidate fan parameter ranges is a duty cycle range of the system fan 22. The candidate operating parameter ranges do not overlap with each other, an upper limit of each candidate operating parameter range is a lower limit of the next candidate operating parameter range; the candidate fan parameter ranges do not overlap with each other, an upper limit of each fan parameter range is a lower limit of the next fan parameter range. As shown in FIG. 6, the method of obtaining the second load parameter includes: step S401: using one of the plurality of candidate operating parameter ranges in which the second operating parameter of the second processor falls into as a target operating parameter range, and using one of the plurality of candidate fan parameter ranges corresponding to the target operating parameter range as a target fan parameter range; step S403: performing interpolation according to the second operating parameter of the second processor, the target operating parameter range and the target fan parameter range to obtain a second interpolated fan parameter; and step S405: using a sum of the second interpolated fan parameter and a lower limit of the target fan parameter range as the second load parameter.

In step S401, the controller 21 uses the candidate operating parameter range which the second operating parameter falls into as the target operating parameter range, and uses the fan parameter range corresponding to the target operating parameter range as the target fan parameter range. For example, the candidate operating parameter range is a temperature range, the second operating parameter is a temperature of the second processor A11, the controller 21 uses the candidate operating parameter range containing the value of the temperature of the second processor A11 as the target operating parameter range, and uses the candidate fan parameter range (for example, the duty cycle range) corresponding to the target operating parameter range as the target fan parameter range.

In step S403, the controller 21 performs interpolation according to the second operating parameter, the target operating parameter range and the target fan parameter range of the second processor A11 to obtain the second interpolated fan parameter. specifically, the controller 21 subtracts the lower limit of the target operating parameter range from the upper limit of the target operating parameter range to obtain a first value, subtracts the lower limit of the target fan parameter range from the upper limit of the target fan parameter range to obtain a second value, subtracts the target operating parameter range from the second operating parameter to obtain a third value, and dividing a value of the third value multiplied with the second value by the first value to obtain the second interpolated fan parameter. In step S405, the controller 21 uses a sum of the second interpolated fan parameter and the lower limit of the target fan parameter range as the second load parameter.

In addition, the implementation of step S303*a* of FIG. 5(*a*) may also adopt the process as shown in FIG. 6 to obtain the first load parameter. In other words, the method of obtaining the first load parameter may be: obtaining one of the candidate operating parameter ranges of the first corresponding function that the first operating parameter of the first processor falls into as the target operating parameter range, and using one of the candidate fan parameter ranges of the first corresponding function corresponding to the target operating parameter range as the target fan parameter range; performing interpolation according to the first operating parameter of the first processor, the target operating parameter range and the target fan parameter range to obtain a first interpolated fan parameter; and using a sum of the first interpolated fan parameter and the target fan parameter range as the first load parameter.

Figure 7:
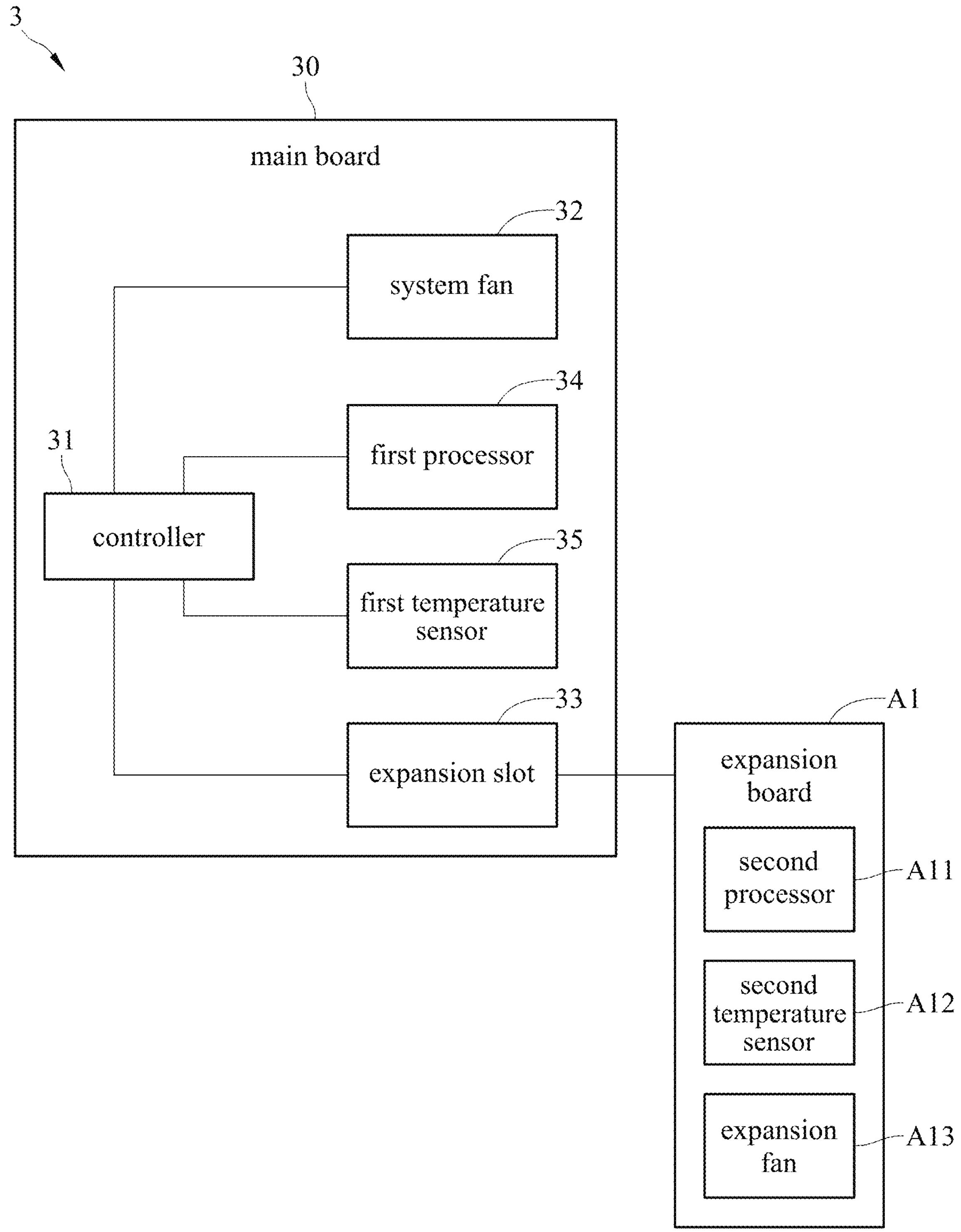
FIG. 7 is a block diagram illustrating a fan speed control device and an expansion board according to yet another embodiment of the present disclosure.

Please refer to FIG. 7, wherein FIG. 7 is a block diagram illustrating a fan speed control device and an expansion board according to yet another embodiment of the present disclosure. As shown in FIG. 7, the fan speed control device 3 according to yet another embodiment of the present disclosure includes a main board 30, a controller 31, a system fan 32, an expansion slot 33, a first processor 34 and a first temperature sensor 35, wherein the expansion slot 33 is electrically connected to the expansion board A1. The system fan 32, the expansion slot 33, the first processor 34 and the first temperature sensor 35 are electrically connected to or in communication connection with the controller 31. The first temperature sensor 35 is configured to sense an operating temperature of the main board 30, output the sensing result of the first temperature sensor 35 to the controller 31. Due to a highly fluctuated operating temperature of the first processor 34, in comparison, the operating temperature of the main board 30 is relatively moderate, the sensing result of a second temperature sensor A12 is also relatively moderate. The implementation of the main board 30, the controller 31, the system fan 32, the expansion slot 33 and the first processor 34 are the same as the main board 20, the controller 21, the system fan 22, the expansion slot 23 and the first processor 24 shown in FIG. 3, their details are not repeated herein. The expansion board A1 includes a second processor A11, a second temperature sensor A12 and an expansion fan A13. The expansion board A1 and the second processor A11 may be the same as the expansion board A1 and the second processor A11 of FIG. 3 respectively. The second temperature sensor A12 is configured to sense the temperature of the second processor A11, the expansion fan A13 is controlled by the controller 31. In addition, in FIG. 1 and FIG. 3, the controller may also be connected to the first temperature sensor which is used to sense the operating temperature of the main board, the expansion board may also be disposed with the second processor and the second temperature sensor for sensing the temperature of the second processor, and the sensing result may be transmitted to the controller through the expansion slot.

Figure 8:
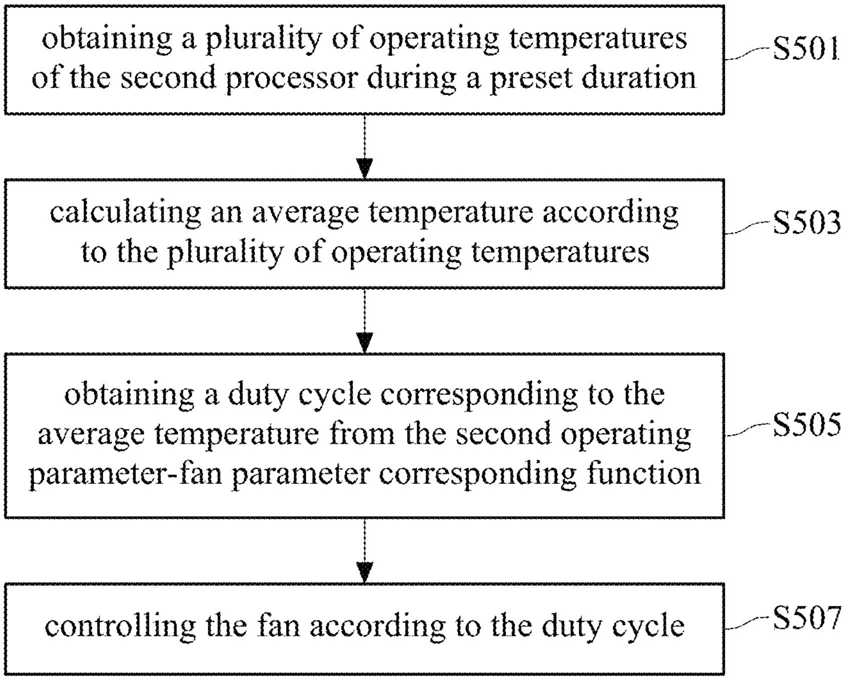
FIG. 8 is a flowchart illustrating a fan speed control method according to another embodiment of the present disclosure.

Please refer to FIG. 7 and FIG. 8, wherein FIG. 8 is a flowchart illustrating a fan speed control method according to another embodiment of the present disclosure. Steps shown in FIG. 8 may be performed by the controller 31, and may be regarded as a detail flowchart of an embodiment of step S207 of FIG. 4. As shown in FIG. 8, the fan speed control method includes: step S501: obtaining a plurality of operating temperatures of the second processor during a preset duration; step S503: calculating an average temperature according to the plurality of operating temperatures; step S505: obtaining a duty cycle corresponding to the average temperature from the second operating parameter-fan parameter corresponding function; and step S507: controlling the fan according to the duty cycle.

In step S501, the controller 31 obtains the operating temperatures of the second processor A11 during the preset duration, wherein the operating temperatures of the second processor A11 may be obtained by the sensing of the second temperature sensor A12, and the second temperature sensor A12 transmits the sensing result to the controller 31.

Because the operating temperatures of the second processor A11 fluctuate significantly, the sensing result of the second temperature sensor A12 also fluctuates significantly. For example, the preset duration may be 30 seconds, 40 seconds or 1 minute, and the length of the preset duration may be the same as the preset period of time as described above, the present disclosure does not limit the length of the preset duration.

In step S503, the controller 31 calculates the average temperature of the operating temperatures. In step S505, the controller 31 obtains the duty cycle (the second fan parameter) corresponding to the average temperature from the second corresponding function. In addition, if the second corresponding function includes the plurality of candidate operating parameter ranges and the plurality of candidate fan parameter ranges corresponding to the candidate operating parameter ranges, the method of obtaining the duty cycle corresponding to the average temperature may also be performing the interpolation as described above according to the average temperature, the target operating parameter range and the target fan parameter range. In step S507, the controller 31 controls the speed of the expansion fan A13 according to the duty cycle directly obtained from the second corresponding function or from the interpolation. Further, in addition to storing table 3 and table 4 (and/or table 1 and table 2), the controller 31 may further store another corresponding function, which includes the plurality of operating parameters of the first processor 34 and the corresponding fan parameters of the system fan 22. The controller 31 may obtain the duty cycle corresponding to the average temperature from the corresponding function of the system fan 22, and control the speed of the system fan 22 according to the duty cycle. The operating parameter of the first processor 34 described above may be the temperature or processor usage of the main board 30. Specifically, in the embodiment where the temperature of the first processor 34 is used as the operating parameter of the first processor 34, the fan speed control device 3 further includes the first temperature sensor 35 connected to the controller 31, the first temperature sensor 35 is configured to sense the temperature of the main board 30 or the temperature of the first processor 34 itself.

Figure 9A:
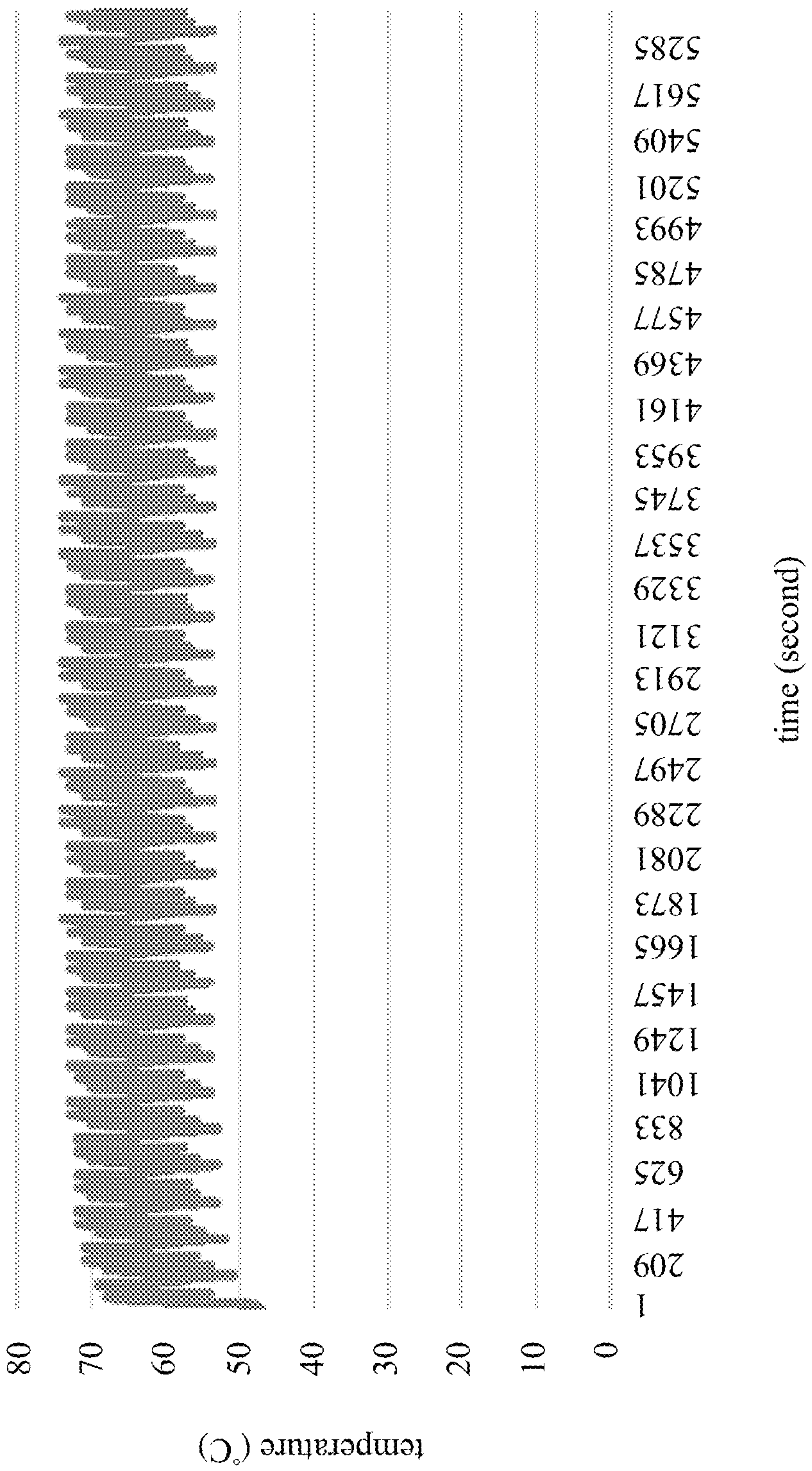
FIG. 9(*a*) illustrates the temperature change of the second processor A11 on the expansion board A1, FIG. 9(*b*) illustrates the voltage change of the expansion fan A13 on the expansion board A1 without using the technology of the present disclosure to control the fan speed, FIG. 9(*c*) illustrates the voltage change of the expansion fan A13 on the expansion board A1 according to the fan speed control method and device of the present disclosure to control the fan speed.
Figure 9B:
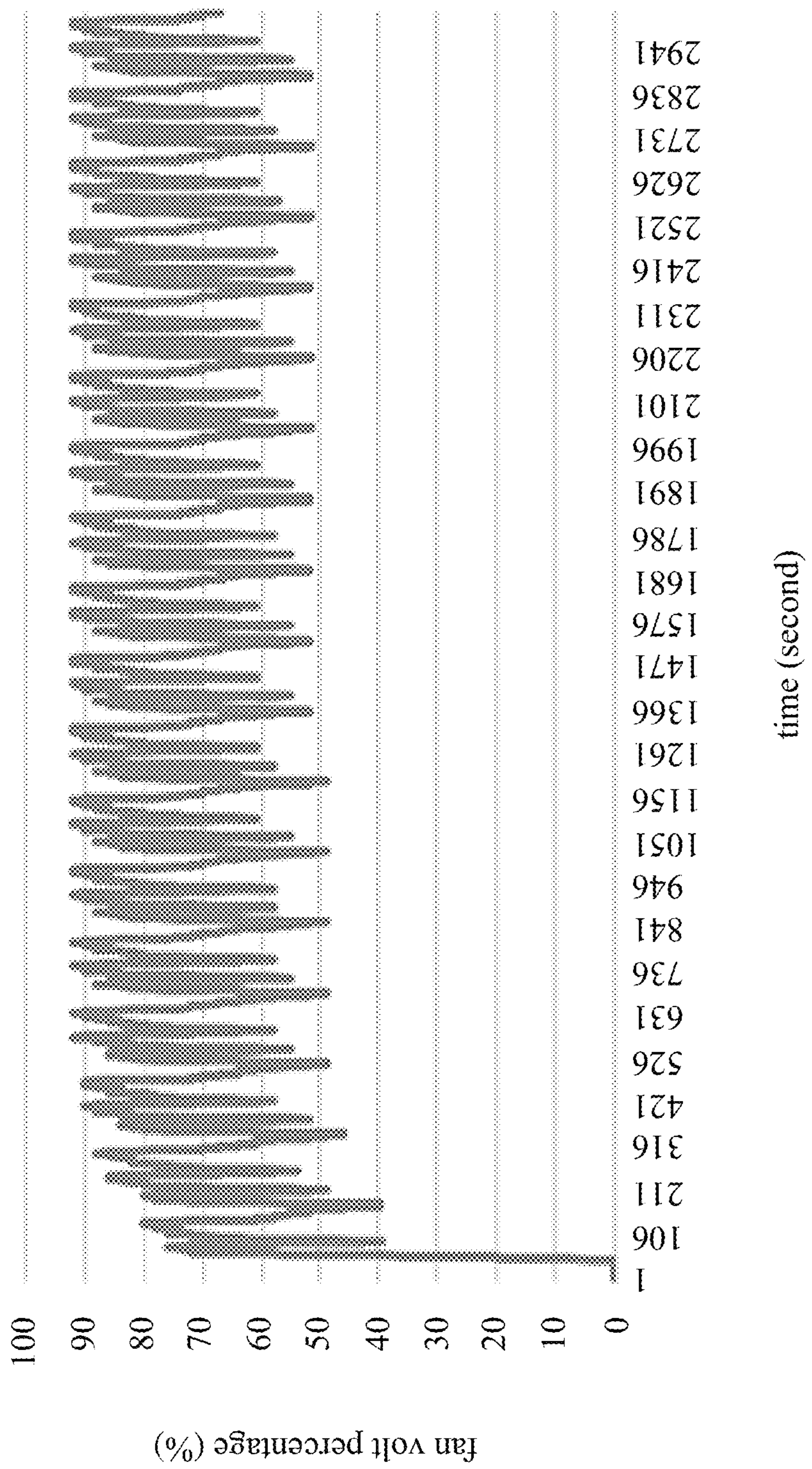
Figure 9C:
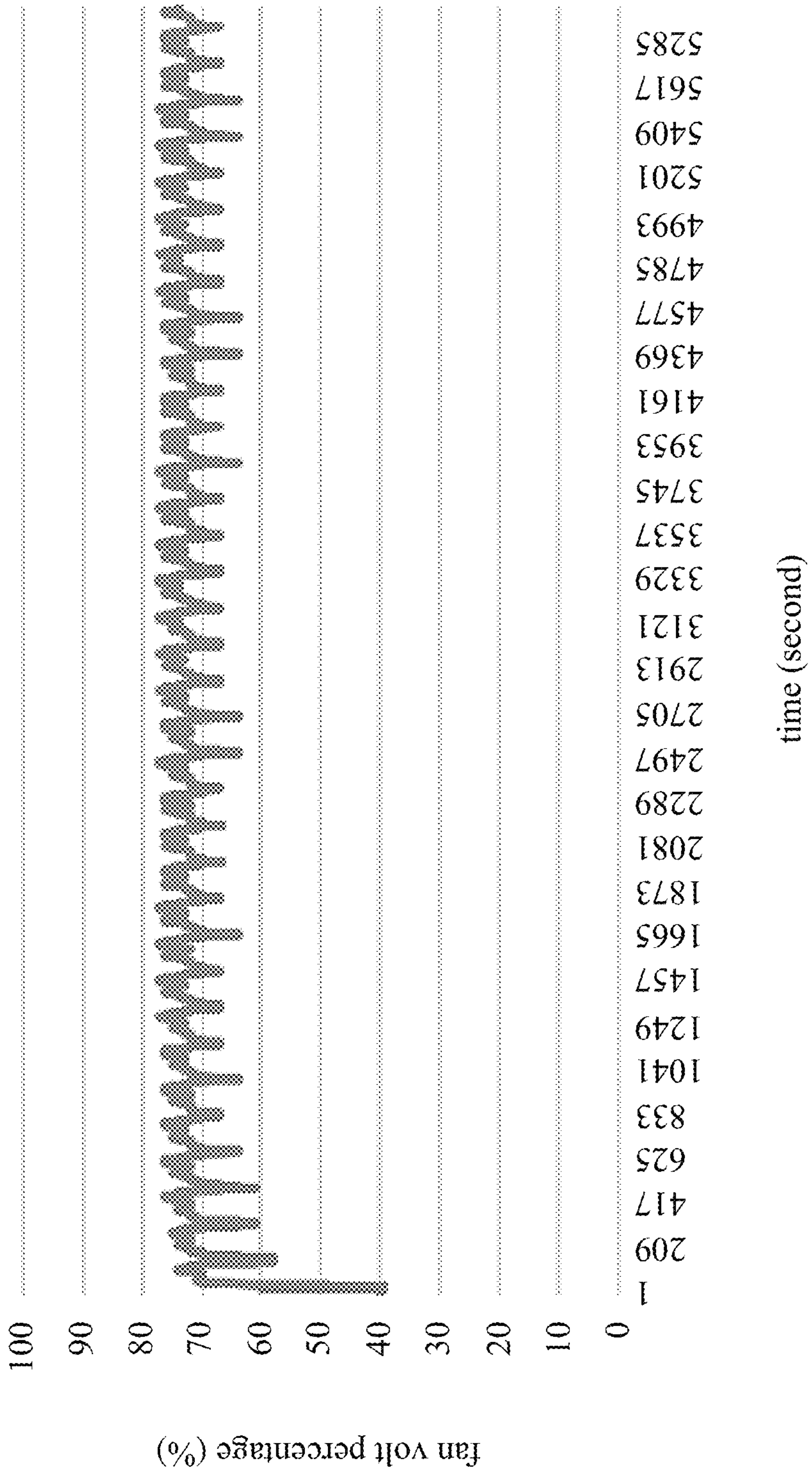

Please refer to FIG. 9(*a*), FIG. 9(*b*) and FIG. 9(*c*), wherein FIG. 9(*a*) illustrates the temperature change of the second processor A11 on the expansion board A1, FIG. 9(*b*) illustrates the voltage change of the expansion fan A13 on the expansion board A1 without using the technology of the present disclosure to control the fan speed, and FIG. 9(*c*) illustrates the voltage change of the expansion fan A13 on the expansion board A1 according to the fan speed control method and device of the present disclosure to control the fan speed. The unit of the horizontal axis of FIG. 9(*a*) is time (second), the unit of the vertical axis is temperature (° C.); the measured subject of FIG. 9(*b*) and FIG. 9(*c*) is a video graphics array (VGA), wherein the unit of the horizontal axis is time (second), and the unit of the vertical axis is fan volt percentage.

As shown in FIG. 9(*a*) and FIG. 9(*b*), the temperature of the second processor A11 on the expansion board A1 rises and falls rapidly between 50° C. and 70° C., causing the fan volt of the expansion board A1 to rise and fall rapidly between 50V and 90V, wherein the range of this fan volt causes around 23 dBA to 37 dBA of noise range. Therefore, as can be seen from FIG. 9(*a*) and FIG. 9(*b*), since the fan speed changes correspondingly with the temperature of the second processor A11 on the expansion board A1, the speed of the fan also rises and falls rapidly, thereby causing unpleasant noise.

As shown in FIG. 9(*c*), the fan speed control method and device according to the present disclosure, the fan volt of the expansion fan A13 on the expansion board A1 correspondingly rises and falls smoothly between 60V and 70V, wherein the range of this fan volt only causes around 32 dBA to 35 dBA of noise range. Therefore, as can be seen from FIG. 9(*c*), the fan speed control method and device according to the present disclosure may be used to ease the variation of the fan volt, thereby reducing unpleasant noise.

In a specific embodiment, the operating parameter indicates the temperature sensed by the first temperature sensor 35 or the second temperature sensor A12, and the fan parameter indicates the duty cycle used as a control signal, and the corresponding function indicates a corresponding relationship between temperature and duty cycle. Specifically, the corresponding function is a lookup table between temperatures and duty cycles. Since the result of the second temperature sensor A12 sensing the second processor A11 fluctuates rapidly, if the sensing result of the second temperature sensor A12 is used to look up the duty cycle or converted into the duty cycle, and the duty cycle is used to control the expansion fan A13, the speed of the expansion fan A13 also fluctuates rapidly, which causes the user to easily perceive the change of the speed and the accompanying noise. In comparison, since the result of the main board 30 sensing the first temperature sensor 35 fluctuates smoothly, if the sensing result of the first temperature sensor 35 is used to look up the duty cycle or converted into the duty cycle and the duty cycle is used to control the expansion fan A13, the speed of the expansion fan A13 also fluctuates smoothly. The present disclosure uses the controller 31 on the main board 30 along with the sensing result of the first temperature sensor 35 to look up the duty cycle or converted into the duty cycle, then the signal of the duty cycle is transmitted to the expansion fan A13 through the expansion slot 33, thereby controlling the speed of the expansion fan A13. Accordingly, the violent fluctuation of the expansion fan A13 may be avoided, the user may not perceive the speed variation of the expansion fan A13 and the accompanying noise.

In another specific embodiment, the present disclosure further provides a fan speed control method performed by the controller 31 on the main board 30. The controller 31 obtains the first load parameter associated with the main board 30, and controls the expansion fan A13 on the expansion board A1 according to the first load parameter, wherein the first load parameter may be a parameter reflecting the operation condition of the main board 10, and includes temperature of the main board 30, speed or duty cycle of the system fan 32, the processor usage of the processor disposed on the main board 30 or wattage consumption of the main board 30 etc.

In still another specific embodiment, the controller 31 on the main board 30 controls the fan according to the corresponding function and the operating parameter corresponding to the first load parameter. Specifically, the operating parameter indicates the temperature sensed by the first temperature sensor 35, the fan parameter indicates the duty cycle used as the control signal, and the corresponding function indicates a lookup table containing the relationships between temperatures and duty cycles. In other words, the controller 31 on the main board 30 uses the temperature sensed by the first temperature sensor 35 and the lookup table between temperatures and duty cycles to obtain the duty cycle, and transmits the signal of the duty cycle to the expansion fan A13, thereby controlling the speed of the expansion fan A13.

In view of the above description, the fan speed control method and device according to one or more embodiments of the present disclosure may allow the speed of the fan to not fluctuates rapidly by the operation condition of the expansion board when cooling is performed using the fan. Accordingly, the fan speed may be steadily controlled, thereby easing the noise caused by the operating fan.

What is claimed is:

1. A fan speed control method, performed by a controller, comprising:

- obtaining a first load parameter associated with a main board, comprising:
  - obtaining a first operating parameter of a first processor disposed on the main board; and
  - obtaining a first fan parameter corresponding to the first operating parameter from a first operating parameter-fan parameter corresponding function as the first load parameter,
- obtaining a second load parameter associated with an expansion board, comprising:
  - obtaining a second operating parameter of a second processor disposed on the expansion board; and
  - obtaining a second fan parameter corresponding to the second operating parameter from a second operating parameter-fan parameter corresponding function as the second load parameter;
- determining a greater one of the first load parameter and the second load parameter; and
- controlling a fan according to the greater one;
- wherein the second operating parameter-fan parameter corresponding function comprises a plurality of candidate operating parameter ranges and a plurality of candidate fan parameter ranges corresponding to the plurality of candidate operating parameter ranges respectively, and obtaining the second fan parameter corresponding to the second operating parameter from the second operating parameter-fan parameter corresponding function as the second load parameter comprises:
  - using one of the plurality of candidate operating parameter ranges in which the second operating parameter of the second processor falls into as a target operating parameter range, and using one of the plurality of candidate fan parameter ranges corresponding to the target operating parameter range as a target fan parameter range;
  - performing interpolation according to the second operating parameter of the second processor, the target operating parameter range and the target fan parameter range to obtain a second interpolated fan parameter; and
  - using a sum of the second interpolated fan parameter and a lower limit of the target fan parameter range as the second load parameter.

2. The fan speed control method according to claim 1, wherein controlling the fan according to the greater one comprises:

- controlling the fan according to an operating parameter-fan parameter corresponding function corresponding to the greater one.

3. The fan speed control method according to claim 2, wherein the first load parameter is a load parameter of a first processor disposed on the main board, the second load parameter is a load parameter of a second processor disposed on the expansion board, wherein controlling the fan according to the operating parameter-fan parameter corresponding function corresponding to the greater one comprises:

- controlling the fan according to a first operating parameter-fan parameter corresponding function and an operating parameter of the first processor when the second load parameter is lower than the first load parameter;
- controlling the fan according to a second operating parameter-fan parameter corresponding function and an operating parameter of the second processor when the second load parameter is greater than the first load parameter; and
- controlling the fan according to the first operating parameter-fan parameter corresponding function and the operating parameter of the first processor or controlling the fan according to the operating parameter and the second operating parameter-fan parameter corresponding function of the second processor when the second load parameter is equal to the first load parameter.

4. The fan speed control method according to claim 3, wherein the expansion board is further disposed with a temperature sensor for sensing a temperature of the second processor, and controlling the fan according to the operating parameter and the second operating parameter-fan parameter corresponding function of the second processor comprises:

- obtaining a plurality of operating temperatures of the second processor during a preset duration;
- calculating an average temperature according to the plurality of operating temperatures;
- obtaining a duty cycle corresponding to the average temperature from the second operating parameter-fan parameter corresponding function; and
- controlling the fan according to the duty cycle.

5. The fan speed control method according to claim 3, wherein when the second load parameter is equal to the first load parameter, the fan is controlled according to the operating parameter and the first operating parameter-fan parameter corresponding function of the first processor.

6. The fan speed control method according to claim 1, wherein a physical unit of the first fan parameter or the second fan parameter is a duty cycle of a pulse-width modulation, or revolutions per minute of the fan.

7. The fan speed control method according to claim 1, wherein the first operating parameter-fan parameter corresponding function describes a first corresponding policy of the first fan parameter corresponding to the first operating parameter, or a first numerical lookup table listing the first fan parameter corresponding to the first operating parameter, or a first function graph presenting the first fan parameter corresponding to the first operating parameter.

8. The fan speed control method according to claim 1, wherein the second operating parameter-fan parameter corresponding function describes a second corresponding policy of the second fan parameter corresponding to the second operating parameter, or a second numerical lookup table listing the second fan parameter corresponding to the second operating parameter, or a second function graph presenting the second fan parameter corresponding to the second operating parameter.

9. A fan speed control device, comprising:
- a main board;
- an expansion slot disposed on the main board and configured to electrically connect an expansion board;
- a fan disposed on the expansion board; and
- a controller disposed on the main board, electrically connected to the expansion slot, and configured to perform:
  - obtaining a first load parameter associated with the main board, comprising:
    - obtaining a first operating parameter of a first processor disposed on the main board; and
    - obtaining a first fan parameter corresponding to the first operating parameter from a first operating parameter-fan parameter corresponding function as the first load parameter;
  - obtaining a second load parameter associated with the expansion board, comprising:
    - obtaining a second operating parameter of a second processor disposed on the expansion board; and
    - obtaining a second fan parameter corresponding to the second operating parameter from a second operating parameter-fan parameter corresponding function as the second load parameter;
  - determining a greater one of the first load parameter and the second load parameter; and
  - controlling a fan according to the greater one;
- wherein the second operating parameter-fan parameter corresponding function comprises a plurality of candidate operating parameter ranges and a plurality of candidate fan parameter ranges corresponding to the plurality of candidate operating parameter ranges respectively, and the controller performs obtaining the second fan parameter corresponding to the second operating parameter from the second operating parameter-fan parameter corresponding function as the second load parameter comprises:
  - using one of the plurality of candidate operating parameter ranges in which the second operating parameter of the second processor falls into as a target operating parameter range, and using one of the plurality of candidate fan parameter ranges corresponding to the target operating parameter range as a target fan parameter range;
  - performing interpolation according to the second operating parameter of the second processor, the target operating parameter range and the target fan parameter range to obtain a second interpolated fan parameter; and
  - using a sum of the second interpolated fan parameter and a lower limit of the target fan parameter range as the second load parameter.

10. The fan speed control device according to claim 9, wherein the controller performs controlling the fan according to the greater one comprises:
- controlling the fan according to an operating parameter-fan parameter corresponding function corresponding to the greater one.

11. The fan speed control device according to claim 10, further comprising a first processor disposed on the main board, wherein the first load parameter is a load parameter of the first processor, the second load parameter is a load parameter of a second processor disposed on the expansion board, and the controller performs controlling the fan according to the operating parameter-fan parameter corresponding function corresponding to the greater one comprises:
- controlling the fan according to a first operating parameter-fan parameter corresponding function and an operating parameter of the first processor when the second load parameter is lower than the first load parameter;
- controlling the fan according to a second operating parameter-fan parameter corresponding function and an operating parameter of the second processor when the second load parameter is greater than the first load parameter; and
- controlling the fan according to the first operating parameter-fan parameter corresponding function and the operating parameter of the first processor or controlling the fan according to the operating parameter and the second operating parameter-fan parameter corresponding function of the second processor when the second load parameter is equal to the first load parameter.

12. The fan speed control device according to claim 11, wherein the expansion board is further disposed with a temperature sensor for sensing a temperature of the second processor, and the controller performs controlling the fan according to the operating parameter and the second operating parameter-fan parameter corresponding function of the second processor comprises:
- obtaining a plurality of operating temperatures of the second processor during a preset duration;
- calculating an average temperature according to the plurality of operating temperatures;
- obtaining a duty cycle corresponding to the average temperature from the second operating parameter-fan parameter corresponding function; and
- controlling the fan according to the duty cycle.

13. The fan speed control device according to claim 11, wherein when the second load parameter is equal to the first load parameter, the controller controls the fan according to the operating parameter and the first operating parameter-fan parameter corresponding function of the first processor.

14. The fan speed control device according to claim 9, wherein a physical unit of the first fan parameter or the second fan parameter is a duty cycle of a pulse-width modulation, or revolutions per minute of the fan.

15. The fan speed control device according to claim 9, wherein the first operating parameter-fan parameter corresponding function describes a first corresponding policy of the first fan parameter corresponding to the first operating parameter, or a first numerical lookup table listing the first fan parameter corresponding to the first operating parameter, or a first function graph presenting the first fan parameter corresponding to the first operating parameter.

16. The fan speed control device according to claim 9, wherein the second operating parameter-fan parameter corresponding function describes a second corresponding policy of the second fan parameter corresponding to the second operating parameter, or a second numerical lookup table listing the second fan parameter corresponding to the second operating parameter, or a second function graph presenting the second fan parameter corresponding to the second operating parameter.

* * * * *